(12) United States Patent
Nagai et al.

(10) Patent No.: US 12,308,461 B2
(45) Date of Patent: May 20, 2025

(54) BATTERY MODULE

(71) Applicants: TOYOTA JIDOSHA KABUSHIKI KAISHA, Toyota (JP); PRIME PLANET ENERGY & SOLUTIONS, INC., Tokyo (JP)

(72) Inventors: Hiroki Nagai, Ama-gun (JP); Takaaki Matsui, Toyota (JP); Takafumi Nose, Nagoya (JP); Koichiro Isobe, Toyota (JP); Koji Fujinaga, Kakogawa (JP); Kouhei Tsuzuki, Kobe (JP)

(73) Assignees: TOYOTA JIDOSHA KABUSHIKI KAISHA, Toyota (JP); PRIME PLANET ENERGY & SOLUTIONS, INC., Tokyo (JP)

( * ) Notice: Subject to any disclaimer, the term of this patent is extended or adjusted under 35 U.S.C. 154(b) by 693 days.

(21) Appl. No.: 17/572,772

(22) Filed: Jan. 11, 2022

(65) Prior Publication Data
US 2022/0271386 A1    Aug. 25, 2022

(30) Foreign Application Priority Data
Feb. 22, 2021 (JP) ................ 2021-026327

(51) Int. Cl.
*H01M 50/289* (2021.01)
*H01M 10/0525* (2010.01)
*H01M 50/204* (2021.01)
*H01M 50/249* (2021.01)

(52) U.S. Cl.
CPC ..... *H01M 50/289* (2021.01); *H01M 10/0525* (2013.01); *H01M 50/204* (2021.01); *H01M 50/249* (2021.01); *H01M 2220/20* (2013.01)

(58) Field of Classification Search
CPC ............ H01M 50/204; H01M 50/289; H01M 50/209; H01M 50/471; H01M 50/207; H01M 50/293; H01M 50/291; H01M 10/0413; H01M 10/04; H01M 10/0525;
(Continued)

(56) References Cited

U.S. PATENT DOCUMENTS

2016/0268573 A1\* 9/2016 Ishihara ............. H01M 50/209
2018/0342722 A1   11/2018 Zeng et al.
2021/0328251 A1\* 10/2021 Zhao .................. H01M 10/613

FOREIGN PATENT DOCUMENTS

CN   108963184 A   12/2018
JP   2016-066541 A   4/2016
(Continued)

OTHER PUBLICATIONS

JP-2017084550-A—Machine translation (Year: 2018).\*

*Primary Examiner* — Haroon S. Sheikh
(74) *Attorney, Agent, or Firm* — Oliff PLC

(57) ABSTRACT

A battery module includes a pair of secondary batteries disposed adjacent to each other and a spacer disposed between the secondary batteries. Each of the secondary batteries includes a plurality of electrodes each of which has a rectangular shape and is disposed to face each other, a case configured to house the electrodes, the case having a rectangular parallelepiped shape, and an electrolyte in the case. The spacer is made of an elastic body. An aspect ratio of each of the electrodes is 10 or less, and a spring constant of the spacer is 0.03 MPa/mm or more and 5.4 MPa/mm or less.

2 Claims, 5 Drawing Sheets

(58) Field of Classification Search
CPC ......... H01M 2220/10; H01M 2220/20; H01M 2220/30
See application file for complete search history.

(56) References Cited

FOREIGN PATENT DOCUMENTS

| | | |
|---|---|---|
| JP | 2017-84550 A | 5/2017 |
| WO | 2020/017458 A1 | 1/2020 |

\* cited by examiner

FIG. 5

| | ASPECT RATIO | SPRING CONSTANT [Mpa/mm] | SWELLING RATE [%] | RESISTANCE INCREASE RATE [%] | DETERMINATION | CYCLE MAINTENANCE RATE [%] | DETERMINATION |
|---|---|---|---|---|---|---|---|
| EXAMPLE 1 | 1.5 | 0.03 | 10.00 | 100.0 | A | 100.0 | A |
| EXAMPLE 2 | 1.5 | 0.04 | 9.00 | 99.0 | A | 100.0 | A |
| EXAMPLE 3 | 1.5 | 0.1 | 5.00 | 100.0 | A | 100.0 | A |
| EXAMPLE 4 | 1.5 | 0.5 | 2.10 | 100.0 | A | 100.0 | A |
| EXAMPLE 5 | 1.5 | 1 | 1.11 | 100.0 | A | 100.0 | A |
| EXAMPLE 6 | 1.5 | 2 | 0.51 | 100.0 | A | 101.0 | A |
| EXAMPLE 7 | 1.5 | 3 | 0.40 | 99.0 | A | 100.0 | A |
| EXAMPLE 8 | 1.5 | 4 | 0.30 | 100.0 | A | 100.0 | A |
| EXAMPLE 9 | 1.5 | 5 | 0.20 | 100.0 | A | 100.0 | A |
| EXAMPLE 10 | 1.5 | 5.2 | 0.16 | 99.0 | A | 100.0 | A |
| EXAMPLE 11 | 1.5 | 5.3 | 0.13 | 100.0 | A | 100.0 | A |
| EXAMPLE 12 | 1.5 | 5.4 | 0.10 | 100.0 | A | 100.0 | A |
| EXAMPLE 13 | 1 | 0.03 | 7.50 | 98.0 | A | 100.0 | A |
| EXAMPLE 14 | 1.2 | 0.03 | 8.20 | 99.0 | A | 100.0 | A |
| EXAMPLE 15 | 1.4 | 0.03 | 9.80 | 100.0 | A | 100.0 | A |
| EXAMPLE 16 | 9.9 | 0.03 | 10.00 | 100.0 | A | 100.0 | A |
| EXAMPLE 17 | 10 | 0.03 | 10.00 | 100.0 | A | 100.0 | A |
| COMPARATIVE EXAMPLE 1 | 1.5 | 0.01 | 12.50 | 100.0 | A | 94.0 | C |
| COMPARATIVE EXAMPLE 2 | 1.5 | 0.02 | 12.00 | 100.0 | A | 95.5 | C |
| COMPARATIVE EXAMPLE 3 | 1.5 | 5.5 | 0.095 | 101.0 | B | 101.0 | A |
| COMPARATIVE EXAMPLE 4 | 1.5 | 5.6 | 0.090 | 103.0 | B | 100.0 | A |
| COMPARATIVE EXAMPLE 5 | 1 | 0.02 | 10.10 | 98.0 | A | 99.5 | B |
| COMPARATIVE EXAMPLE 6 | 1.2 | 0.02 | 10.50 | 99.0 | A | 99.0 | B |
| COMPARATIVE EXAMPLE 7 | 1.4 | 0.02 | 11.00 | 100.0 | A | 98.0 | B |
| COMPARATIVE EXAMPLE 8 | 10.1 | 0.03 | 10.00 | 100.0 | A | 99.0 | B |
| COMPARATIVE EXAMPLE 9 | 10.2 | 0.03 | 10.00 | 100.0 | A | 98.0 | B |

BATTERY MODULE

CROSS-REFERENCE TO RELATED APPLICATION

This application claims priority to Japanese Patent Application No. 2021-026327 filed on Feb. 22, 2021, incorporated herein by reference in its entirety.

BACKGROUND

1. Technical Field

The present disclosure relates to a battery module.

2. Description of Related Art

For example, WO 2020/017458 discloses a battery module including a plurality of cells and an elastic body disposed between the cells. The elastic body is deformable according to a change in volume of the cell. A deformation rate of the elastic body in a thickness direction is in a range of 1% to 80%.

SUMMARY

In the battery module disclosed in WO 2020/017458, it is desirable to keep expansion of each secondary battery within an appropriate range. For example, in a case where the battery module is restrained from both sides in an arrangement direction of each secondary battery so that the expansion of each secondary battery is limited, an electrolyte may be discharged from a case of the secondary battery. On the other hand, in a case where the expansion of each secondary battery is not limited at all, a distance between electrodes may increase due to repeated charging and discharging, and thus a capacity of the secondary battery may decrease.

The present disclosure provides a battery module capable of achieving both suppression of a decrease in capacity of each secondary battery due to repeated charging and discharging and suppression of discharge of an electrolyte from a case of each secondary battery.

An aspect of the present disclosure relates to a battery module. The battery module includes a pair of secondary batteries disposed adjacent to each other and a spacer disposed between the secondary batteries. Each of the secondary batteries includes a plurality of electrodes each of which has a rectangular shape, a case having a rectangular parallelepiped shape, and an electrolyte. The electrodes are disposed to face each other. The case is configured to house the electrodes. The electrolyte is in the case. The spacer is made of an elastic body. An aspect ratio of each of the electrodes is 10 or less, and a spring constant of the spacer is 0.03 MPa/mm or more and 5.4 MPa/mm or less.

In the aspect, the aspect ratio of each of the electrodes may be 1.5 or more.

In the aspect, assuming that a thickness of the case in an arrangement direction of the secondary batteries is d, a distance between the secondary batteries is D, a surface pressure of the spacer when the secondary batteries are compressed until a thickness of the spacer becomes D−0.001d is α1, a surface pressure of the spacer when the secondary batteries are compressed until the thickness of the spacer becomes D−0.002d is α2, (α2−α1)/d(0.002−0.001) =γ1, a surface pressure of the spacer when the secondary batteries are compressed until the thickness of the spacer becomes D−0.1d is β1, a surface pressure of the spacer when the secondary batteries are compressed until the thickness of the spacer becomes D−0.101d is β2, and (β2−β1)/d (0.101−0.1)=γ2, the spacer may be made of a material that satisfies 0.03 MPa/mm<γ1 and 5.4 MPa/mm>γ2.

According to the aspect of the present disclosure, it is possible to provide a battery module capable of achieving both suppression of a decrease in capacity of each secondary battery due to repeated charging and discharging and suppression of discharge of an electrolyte from a case of each secondary battery.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a table showing examples of the present disclosure and test results of the examples.

DETAILED DESCRIPTION OF EMBODIMENTS

Figure 1:
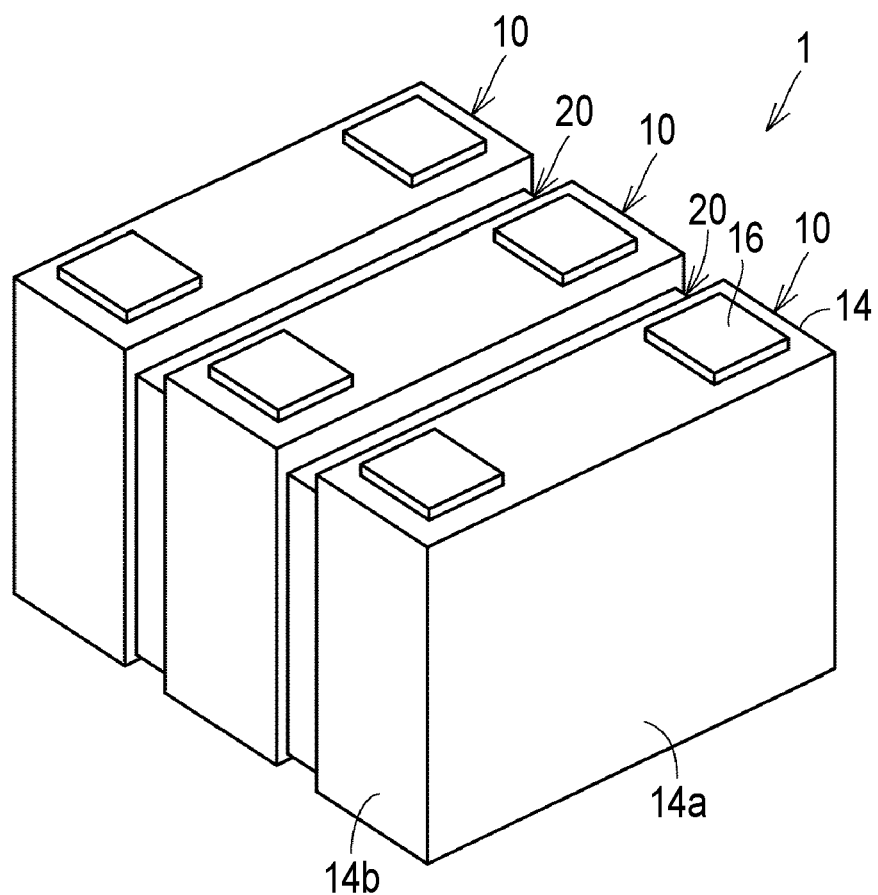
FIG. 1 is a perspective view schematically showing a configuration of a battery module according to an embodiment of the present disclosure.

An embodiment of the present disclosure will be described with reference to the drawings. In the drawings to be referred to below, the same or corresponding members are denoted by the same number.

Figure 2:
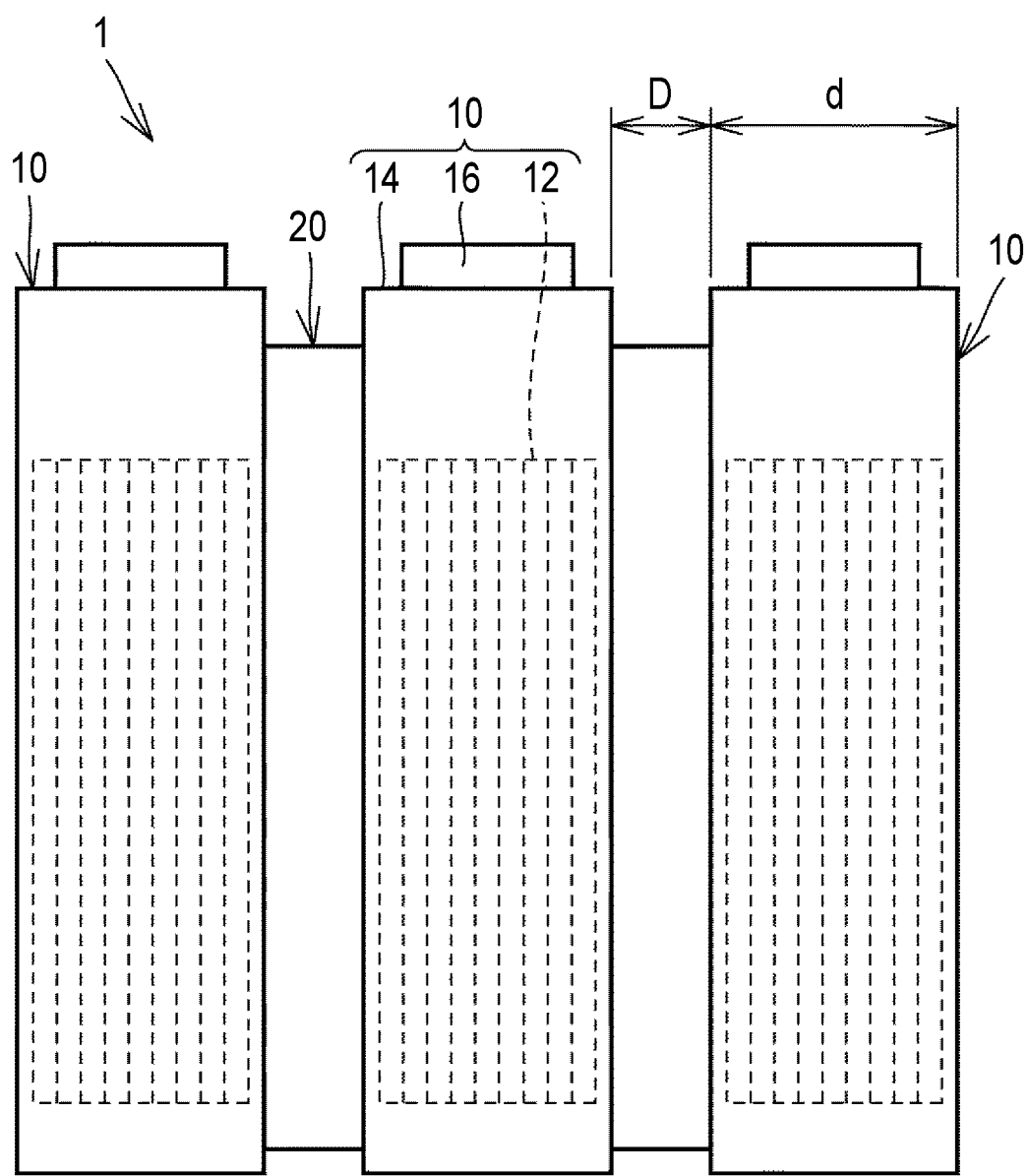
FIG. 2 is a front view of the battery module shown in FIG. 1.

FIG. 1 is a perspective view schematically showing a configuration of a battery module according to an embodiment of the present disclosure. FIG. 2 is a front view of the battery module shown in FIG. 1. A battery module 1 is mounted on a vehicle, for example. Note that a mounting posture of the battery module 1 on the vehicle need not be obtained.

As shown in FIGS. 1 and 2, the battery module 1 includes a pair of secondary batteries 10 and a spacer 20. The number of the secondary batteries 10 and the number of the spacer 20 are not particularly limited.

The secondary batteries 10 are disposed to face each other. Each secondary battery 10 is a nonaqueous secondary battery (lithium ion battery or the like). Each secondary battery 10 has a plurality of electrodes 12 (see FIG. 2), a case 14, and a pair of external terminals 16.

Each electrode 12 is formed in a rectangular shape. The electrodes 12 face each other. An aspect ratio of each electrode 12 is set to 10 or less. The aspect ratio of each electrode 12 is preferably set to 1.5 or more and 10 or less.

The case 14 houses the electrodes 12. The case 14 is filled with an electrolyte. The case 14 is formed in a rectangular parallelepiped shape. The case 14 is formed flat. That is, the case 14 has two first side surfaces 14a having a relatively large area and two second side surfaces 14b having an area smaller than the area of the first side surface 14a. The secondary batteries 10 are disposed such that the first side surfaces 14a of the cases 14 face each other. Each first side surface 14a is formed flat. The electrodes 12 are laminated in an arrangement direction (right and left direction in FIG. 2) of the cases 14.

Each external terminal 16 protrudes from an outer surface (upper surface in the present embodiment) of the case 14. One of the external terminals 16 is a positive electrode terminal, and the other of the external terminals 16 is a negative electrode terminal.

The spacer 20 is disposed between the secondary batteries 10. The spacer 20 is made of an elastic body. In the present embodiment, the spacer 20 is formed in a flat plate shape.

In the battery module 1 as described above, in a case where the battery module 1 is restrained from both sides in an arrangement direction (right and left direction in FIG. 2) of the secondary batteries 10 so that the expansion of each secondary battery 10 is completely restricted, the electrolyte may be discharged from the case 14 of the secondary battery 10, while in a case where the expansion of each secondary battery 10 is not limited at all, a distance between the electrodes 12 may increase due to repeated charging and discharging, and thus a capacity of the secondary battery 10 may decrease. This problem can be solved by allowing a swelling rate of the case 14 of the secondary battery 10 in the arrangement direction to fall within a range of 0.1% or more and 10% or less when the secondary battery 10 is charged. The swelling rate means a ratio of a value obtained by subtracting a dimension of the case 14 in the arrangement direction before charging from a dimension of the case 14 in the arrangement direction after charging, to the dimension of the case 14 in the arrangement direction before charging.

In the present embodiment, a spring constant of the spacer 20 is set to 0.03 MPa/mm or more and 5.4 MPa/mm or less from the viewpoint that the swelling rate of each case 14 in the arrangement direction at the time of charging falls within a range of 0.1% or more and 10% or less. The term "spring constant" means the force per unit area needed for displacing the spacer 20 by 1 mm in a thickness direction of the spacer 20.

The spacer 20 is made of a material that satisfies both the following expressions (1) and (2).

$$0.03 \text{ MPa/mm} < \gamma 1 \quad (1)$$

$$5.4 \text{ MPa/mm} > \gamma 2 \quad (2)$$

γ1 and γ2 are as follows.

$$\gamma 1 = (\alpha 2 - \alpha 1)/d(0.002 - 0.001)$$

$$\gamma 2 = (\beta 2 - \beta 1)/d(0.101 - 0.1)$$

d: Thickness of the case 14 in the arrangement direction
D: Distance between the secondary batteries 10
α1: Surface pressure of the spacer 20 when the secondary batteries 10 are compressed until the thickness of the spacer 20 becomes D−0.001d
α2: Surface pressure of the spacer 20 when the secondary batteries 10 are compressed until the thickness of the spacer 20 becomes D−0.002d
β1: Surface pressure of the spacer 20 when the secondary batteries 10 are compressed until the thickness of the spacer 20 becomes D−0.1d
β2: Surface pressure of the spacer 20 when the secondary batteries 10 are compressed until the thickness of the spacer 20 becomes D−0.101d In the battery module 1 described above, since the aspect ratio of the electrode 12 is 10 or less, a restraining force of each electrode 12 by the case 14 in the arrangement direction is appropriately maintained, so that an increase in distance between the electrodes is suppressed, and since the spring constant of the spacer 20 is 0.03 MPa/mm or more and 5.4 MPa/mm or less, the swelling rate of each case 14 in the arrangement direction falls within a range of 0.1% or more and 10% or less. Therefore, both the suppression of a decrease in capacity of each secondary battery 10 due to repeated charging and discharging and the suppression of discharge of the electrolyte from the case 14 of each secondary battery 10 are effectively achieved.

Figure 3:
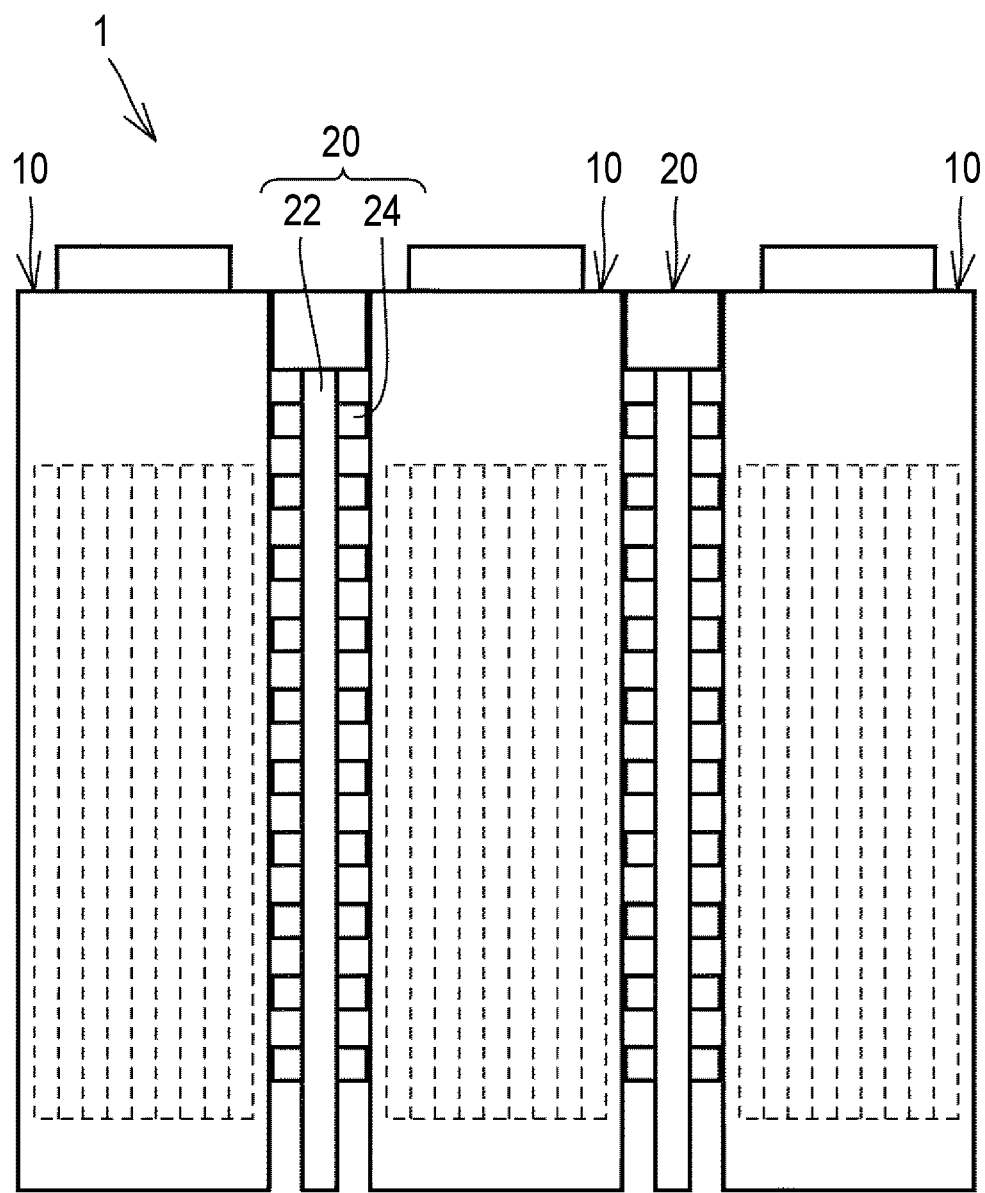
FIG. 3 is a front view showing a modification example of a spacer.

In the above embodiment, as shown in FIG. 3, the spacer 20 may have a base portion 22 formed in a flat plate shape and a plurality of protrusions 24 provided on both side surfaces of the base portion 22 in the arrangement direction (right and left direction in FIG. 3). The protrusions 24 are disposed so as to be separated from each other in a height direction of the case 14 (vertical direction in FIG. 3). In this case, a contact area between the protrusions 24 and the first side surface 14a of the case 14 is preferably set to about 10% to 80% of a projected area of the base portion 22 with respect to the first side surface 14a.

Figure 4:
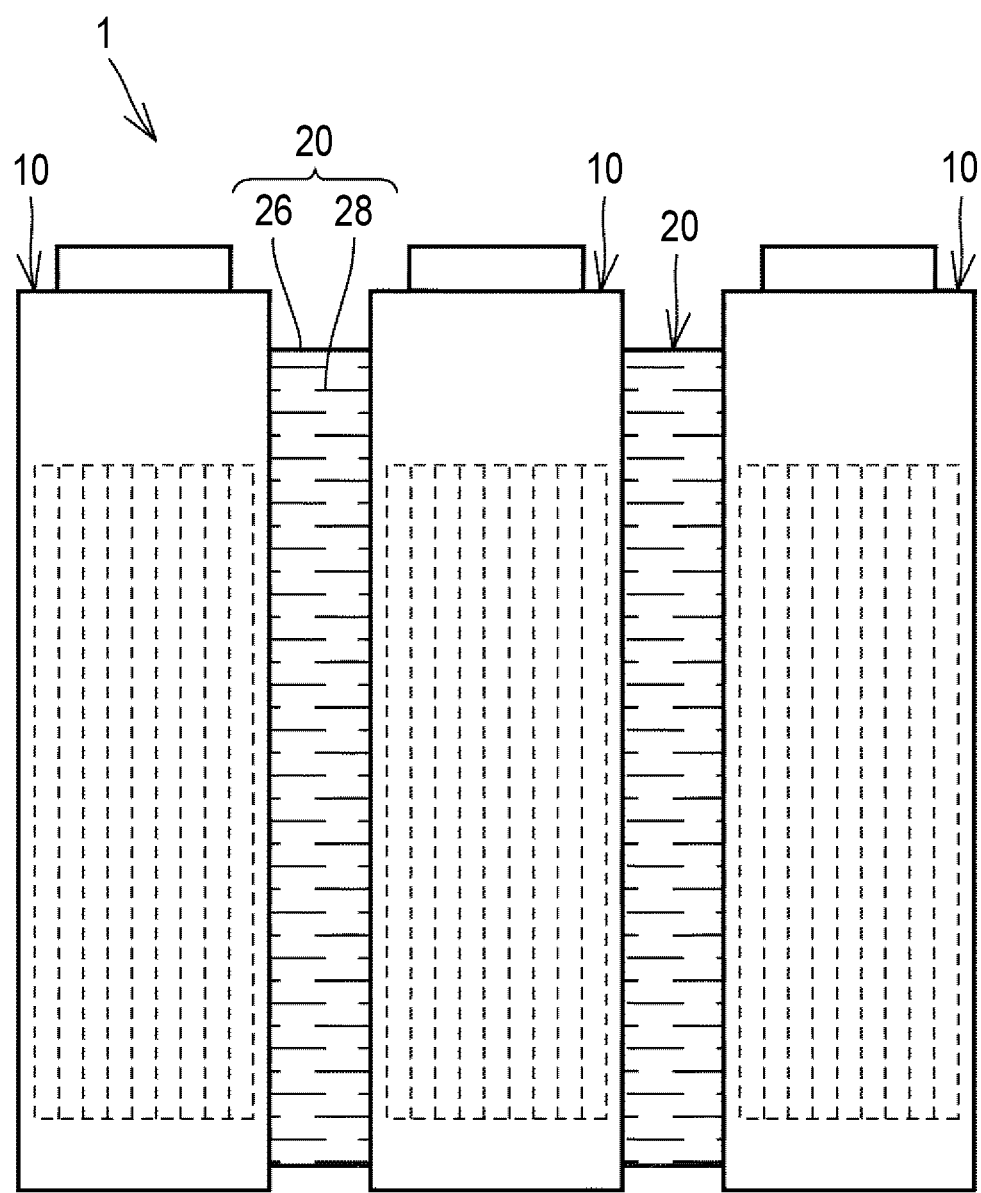
FIG. 4 is a front view showing a modification example of a spacer.

In addition, as shown in FIG. 4, the spacer 20 may have a laminate film 26 and a liquid 28 enclosed in the laminate film 26.

Next, examples and comparative examples of the above-described embodiment and test results thereof will be described with reference to FIG. 5. The test results are results when 500 cycles of charging and discharging were repeated under the following charging condition and discharging condition.

Charging condition: 4.25 V, 0.5 C_CCCV, 0.1 C cut
Discharging condition: 2.8 V, 0.5 C As shown in FIG. 5, in Examples 1 to 17, the aspect ratio of the electrode 12 is 10 or less, and the spring constant of the spacer 20 is 0.03 MPa/mm or more and 5.4 MPa/mm or less. In Examples 1 to 17, it was confirmed that the swelling rate of the case 14 fell within a range of 0.1% or more and 10% or less.

In addition, in Examples 1 to 17, it was confirmed that the resistance increase rate was 100% or less. In the determination column of the resistance increase rate in the table, "A" is indicated when the resistance increase rate is 100% or less, and "B" is indicated when the resistance increase rate is larger than 100%.

Further, in Examples 1 to 17, it was confirmed that the cycle maintenance rate was 100% or more. In the determination column of the cycle maintenance rate in the table, "A" is indicated when the cycle maintenance rate is 100% or more, "B" is indicated when the cycle maintenance rate is less than 100% and 98% or more, and "C" is indicated when the cycle maintenance rate is less than 98%.

On the other hand, each of the comparative examples does not satisfy either the aspect ratio of the electrode 12 of 10 or less or the spring constant of the spacer 20 of 0.03 MPa/mm or more and 5.4 MPa/mm or less. In the comparative examples, there were many cases in which the swelling rate of the case 14 did not fall within a range of 0.1% or more and 10% or less.

Specifically, in Comparative Example 1, Comparative Example 2, and Comparative Examples 5 to 7, the swelling rate of the case 14 became 10% or more due to the spring constant of the spacer 20 being less than 0.03 MPa/mm, whereby the cycle maintenance rate became less than 100%.

In Comparative Examples 3 and 4, the swelling rate of the case 14 became less than 0.1% due to the spring constant of the spacer 20 being larger than 5.4 MPa/mm, whereby the resistance increase rate became larger than 100%.

In Comparative Examples 8 and 9, although the spring constant of the spacer 20 was 0.03 MPa/mm and the swelling rate of the case 14 was 10%, the force for restraining the electrode 12 was reduced due to the aspect ratio of the electrode 12 being larger than 10 (width of the secondary battery 10 was too large), and the cycle maintenance rate became less than 100% due to an increase in distance between the electrodes.

It will be understood by those skilled in the art that the exemplary embodiment and examples described above are specific examples of the following aspects.

The battery module in the above embodiment includes a pair of secondary batteries disposed adjacent to each other and a spacer disposed between the secondary batteries. Each of the secondary batteries includes a plurality of electrodes each of which is formed in a rectangular shape and disposed to face each other, a case configured to house the electrodes, the case being formed in a rectangular parallelepiped shape, and an electrolyte filling an inside of the case. The spacer is made of an elastic body. An aspect ratio of the electrode is 10 or less, and a spring constant of the spacer is 0.03 MPa/mm or more and 5.4 MPa/mm or less.

In the battery module, since the aspect ratio of the electrode is 10 or less, a restraining force of each electrode by the case in the arrangement direction is appropriately maintained, so that an increase in distance between the electrodes is suppressed, and since the spring constant of the spacer is 0.03 MPa/mm or more and 5.4 MPa/mm or less, the swelling rate of each case in the arrangement direction falls within a range of 0.1% or more and 10% or less. Therefore, both the suppression of a decrease in capacity of each secondary battery due to repeated charging and discharging and the suppression of discharge of the electrolyte from the case of each secondary battery are effectively achieved.

The aspect ratio of the electrode is preferably 1.5 or more.

Assuming that a thickness of the case in an arrangement direction of the secondary batteries is d, a distance between the secondary batteries is D, a surface pressure of the spacer when the secondary batteries are compressed until a thickness of the spacer becomes D−0.001d is $\alpha1$, a surface pressure of the spacer when the secondary batteries are compressed until the thickness of the spacer becomes D−0.002d is $\alpha2$, $(\alpha2-\alpha1)/d(0.002-0.001)=\gamma1$, a surface pressure of the spacer when the secondary batteries are compressed until the thickness of the spacer becomes D−0.1d is $\beta1$, a surface pressure of the spacer when the secondary batteries are compressed until the thickness of the spacer becomes D−0.101d is $\beta2$, and $(\beta2-\beta1)/d(0.101-0.1)=\gamma2$, the spacer is preferably made of a material that satisfies 0.03 MPa/mm<$\gamma1$ and 5.4 MPa/mm>$\gamma2$.

It should be understood that the embodiment and examples disclosed herein are merely illustrative and not restrictive in all respects. The scope of the present disclosure is defined by the terms of the claims, rather than the above description of the embodiment and examples, and includes any modifications within the scope and meaning equivalent to the terms of the claims.

What is claimed is:

1. A battery module comprising:
   a pair of secondary batteries disposed adjacent to each other; and
   a spacer disposed between the secondary batteries, wherein:
   each of the secondary batteries includes
      a plurality of electrodes each of which has a rectangular shape and is disposed to face each other,
      a case configured to house the electrodes, the case having a rectangular parallelepiped shape, and
      an electrolyte in the case;
   the spacer is made of an elastic body; and
   an aspect ratio of each of the electrodes is 10 or less, and a spring constant of the spacer is 0.03 MPa/mm or more and 5.4 MPa/mm or less,
   wherein
      (a) a thickness of the case in an arrangement direction of the secondary batteries is d,
      (b) a distance between the secondary batteries is D,
      (c) a surface pressure of the spacer when the secondary batteries are compressed until a thickness of the spacer becomes D−0.001d is $\alpha1$,
      (d) a surface pressure of the spacer when the secondary batteries are compressed until the thickness of the spacer becomes D−0.002d is $\alpha2$,
      (e) $(\alpha2-\alpha1)/d(0.002-0.001)=\gamma1$,
      (f) a surface pressure of the spacer when the secondary batteries are compressed until the thickness of the spacer becomes D−0.1d is $\beta1$,
      (g) a surface pressure of the spacer when the secondary batteries are compressed until the thickness of the spacer becomes D−0.101d is $\beta2$, and
      (h) $(\beta2-\beta1)/d(0.101-0.1)=\gamma2$,
      the spacer is made of a material that satisfies 0.03 MPa/mm<$\gamma1$ and 5.4 MPa/mm>$\gamma2$,
   wherein a swelling rate of the case is within a range of 0.1% or more and 10% or less, and
   wherein a resistance increase rate when 500 charging and discharging cycles are repeated under charge conditions A (4.25 V, 0.5 C_CCCV, 0.1 C cut) and discharge conditions B (2.8 V, 0.5 C) is 98.0% or more and 100.0% or less.

2. The battery module according to claim 1, wherein the aspect ratio of each of the electrodes is 1.5 or more.

* * * * *